US 6,745,449 B2

(12) United States Patent
Hanna et al.

(10) Patent No.: US 6,745,449 B2
(45) Date of Patent: Jun. 8, 2004

(54) METHOD AND APPARATUS FOR MAKING A LID WITH AN OPTICALLY TRANSMISSIVE WINDOW

(75) Inventors: Mark B. Hanna, Allen, TX (US); Kyle W. Nix, Allen, TX (US)

(73) Assignee: Raytheon Company, Waltham, MA (US)

( * ) Notice: Subject to any disclaimer, the term of this patent is extended or adjusted under 35 U.S.C. 154(b) by 24 days.

(21) Appl. No.: 10/045,639

(22) Filed: Nov. 6, 2001

(65) Prior Publication Data

US 2003/0101562 A1 Jun. 5, 2003

(51) Int. Cl.$^7$ ................................................ B23P 25/00
(52) U.S. Cl. ........................ 29/458; 29/557; 361/142; 174/17 GF
(58) Field of Search ........................ 29/458, 415, 424, 29/527.2, 557, 412, 446, 830; 312/90; 361/142, 724; 174/17 GF, 50.5, 50.54

(56) References Cited

U.S. PATENT DOCUMENTS

| | | | |
|---|---|---|---|
| 4,789,228 A | | 12/1988 | Le Pesant et al. |
| 4,988,157 A | | 1/1991 | Jackel et al. |
| 5,061,049 A | * | 10/1991 | Hornbeck .................... 359/224 |
| 5,095,664 A | * | 3/1992 | Zayhowski .................... 451/41 |
| 5,264,393 A | * | 11/1993 | Tamura et al. ................ 438/64 |
| 5,392,155 A | | 2/1995 | Tamari |
| 5,650,915 A | * | 7/1997 | Alfaro et al. ............... 361/707 |
| 5,939,785 A | | 8/1999 | Klonis et al. |
| 6,072,924 A | | 6/2000 | Sato et al. |
| 6,154,305 A | | 11/2000 | Dickensheets et al. |
| 6,513,214 B2 | * | 2/2003 | Nishimura et al. ........ 29/25.35 |
| 2001/0053016 A1 | * | 12/2001 | Nelson |

FOREIGN PATENT DOCUMENTS

EP  0 542 519 A1   5/1993

OTHER PUBLICATIONS

U.S. Ser. No. 09/938,692, filed Aug. 23, 2001, entitled "Method and Apparatus for Controlling Emission of Radiation from a Housing", by inventor Stephen Michael Shockey, 22 pages of text and 2 drawing sheets.
U.S. Ser. No. 10/066,139, filed Jan. 30, 2002, entitled "Method and Apparatus for Configuring an Aperture Edge", by inventor Stephen Michael Shockey, 24 pages of text and 2 drawing sheets.

* cited by examiner

Primary Examiner—Irene Cuda Rosenbaum
Assistant Examiner—Stephen Kenny
(74) Attorney, Agent, or Firm—Baker Botts L.L.P.

(57) ABSTRACT

A metal plate (126) has a plurality of openings (127) extending through it, and is cleaned using a wet hydrogen process (157). Glass windows (106) are then placed in the openings, and are each fused to the metal plate by heat (231) in a manner so that each window projects outwardly on each side of the plate. Both sides of each window are then simultaneously ground and polished (232). Exposed surfaces of the metal plate are electroplated with nickel and gold (236). One or more coatings (41, 46, 47) are applied to one or both sides of each window. Several sections are then cut from the assembly, each of which can serve as a lid (17) for an optical apparatus (10).

8 Claims, 8 Drawing Sheets

METHOD AND APPARATUS FOR MAKING A LID WITH AN OPTICALLY TRANSMISSIVE WINDOW

TECHNICAL FIELD OF THE INVENTION

This invention relates in general to a lid having a frame which supports a window transmissive to radiation and, more particularly, to a method and apparatus for fabricating such a lid.

BACKGROUND OF THE INVENTION

An existing device includes a housing with an opening therein which is closed by a lid. The lid includes a frame, and a window which is disposed within and hermetically sealed to the frame, the window being transmissive to radiation in a waveband of interest. The device can be used in a television or a projector to form images, which are typically projected onto some type of screen so that they can be viewed by a person. The device includes within the housing a digital micromirror device (DMD) of a known type. A beam of radiation enters the housing through the window in the lid, is processed by the digital micromirror device to form a plurality of sub-beams which represent an image, and at least some of the sub-beams then exit the housing through the window in order to facilitate the generation of the image, which is projected onto the screen.

This existing lid is made by forming a metal frame which has an opening through it, placing a piece of glass in the opening through the frame, and then heating the frame and glass until the peripheral edges of the glass become fused to the edges of the opening in the frame. The side surfaces of the glass are then ground and polished, and one or more coatings are applied to both sides of the glass. While this existing lid and the process of making it have been generally adequate for their intended purposes, they have not been satisfactory in all respects.

In this regard, different applications require lids of various different sizes, and/or glass windows of various different sizes. Fabricating each lid as a separate part is time-consuming and expensive, due in part to the separate handling and processing needed for each lid, and also due in part to the fact that separate tooling is needed for each different frame size, and the separate tooling is relatively expensive. In this regard, grinding and polishing of the opposite side surfaces of the glass window in each separate frame requires a special support part capable of properly supporting a frame of that size within a double-disk grinding apparatus, and each such support part must be configured to conform to the particular size of the lid. Some lid configurations are not associated with a high-volume market, and high tooling costs can thus represent a significant portion of the overall manufacturing cost of each individual lid.

A different consideration is that, when fusing each piece of glass to the associated frame, impurities in the frame can cause the formation of gases. For example, carbon impurities in the frame can lead to the formation of carbon-based gases. Since the glass is softened by the heat used for fusing, the gases can in turn produce bubbles within the glass. An excessive quantity of bubbles can degrade the optical properties of the glass window to an extent where the lid is considered defective and must be discarded. This obviously reduces the effective yield of the fabrication process. Techniques have been developed to clean metal frames by removing impurities, for example by processing the frames in a disassociated ammonia environment. However, these techniques have not been satisfactory in all respects. In particular, these techniques have helped to reduce the number of impurities and thus the number of gas bubbles in the glass, thereby increasing production yields. But the number of parts which must be discarded as defective is still undesirably high, which in turn causes the cost of the satisfactory lids to be undesirably high.

SUMMARY OF THE INVENTION

According to a first form of the present invention, a method is provided and involves: forming a plurality of windows which are each transmissive to radiation having a predetermined wavelength; fabricating a plate with a plurality of openings therethrough; fixedly securing each window to the plate in a manner so that an annular seal is provided between an annular portion of the window extending along a periphery thereof and an annular portion of the plate extending around the opening; simultaneously processing a respective surface on each of the windows secured to the plate; and thereafter cutting from the plate a plurality of sections which each include a respective one of the windows and a respective one of the annular portions of the plate.

According to a different form of the invention, an apparatus includes: a plate having a plurality of openings therethrough; and a plurality of windows which are each transmissive to radiation having a predetermined wavelength, each window being secured to the plate in a manner providing an annular seal between an annular portion of the window extending along a periphery thereof and an annular portion of the plate extending around the opening, and each window having thereon a surface which needs to be processed.

According to still another form of the invention, a method involves: heating a metal part in a wet hydrogen atmosphere; thereafter oxidizing a surface of the metal part; thereafter placing a glass part in contact with the surface of the metal part; and thereafter heating the metal part and the glass part to cause the glass part to become fused directly to the metal part.

BRIEF DESCRIPTION OF THE DRAWINGS

A better understanding of the present invention will be realized from the detailed description which follows, taken in conjunction with accompanying drawings, in which.

DETAILED DESCRIPTION OF THE INVENTION

Figure 1:
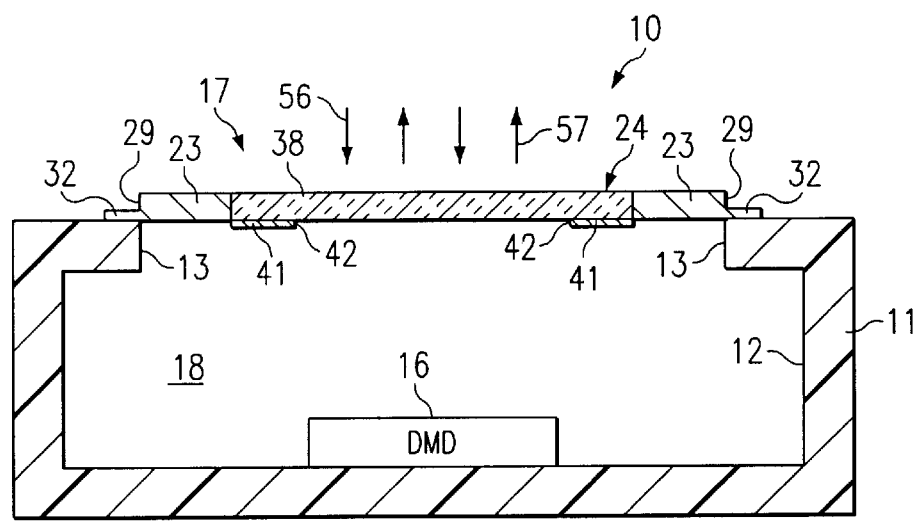
FIG. 1 is a diagrammatic sectional side view of an apparatus which includes a housing with an opening closed by a lid embodying the aspects of the present invention.

FIG. 1 is a diagrammatic sectional side view of an apparatus 10 which embodies aspects of the present invention. The apparatus 10 includes a housing 11 which has a chamber 12 therein, and which has a top wall with a vertical opening 13 through it. A digital micromirror device (DMD) 16 of a known type is supported within the chamber 12, in the center of the top surface of the top wall of the housing 11. The DMD 16 has on an upper side thereof a two-dimensional array of tiny reflective mirrors. These mirrors each correspond to a respective pixel of an image, and can each be independently physically moved by the DMD 16 in response to electrical control signals.

A lid 17 is provided on top of the housing 12, so as to close the opening 13 in a manner effecting a hermetic seal between the interior and exterior of the housing 11. In this regard, the peripheral edges of the lid 17 are seam welded in a known manner to the top surface of the housing 11. A gas is provided in the region 18 within the chamber 12, and the lid 17 ensures that this gas does not escape from the region 18 in the chamber 12. The gas serves to lubricate the mirrors of the two-dimensional array on the DMD 16, in order to facilitate their movement, and to ensure that they have a relatively long operational lifetime. However, this gas is also somewhat corrosive, and the housing 11 and lid 17 are thus resistant to corrosive damage from the gas.

Figure 2:
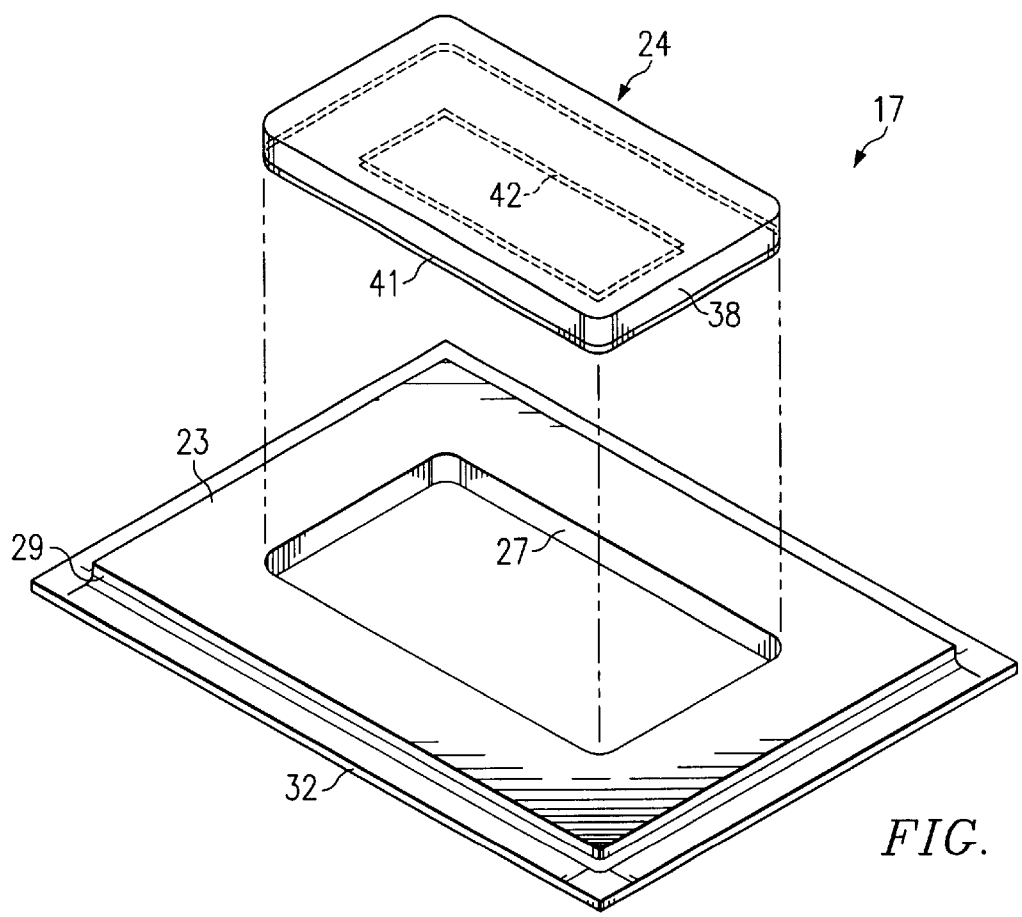
FIG. 2 is a diagrammatic exploded perspective view of the lid of FIG. 1.

FIG. 2 is a diagrammatic perspective exploded view of the lid 17. With reference to FIGS. 1 and 2, the lid 17 includes an annular metal frame 23, and a window 24 which is fixedly mounted within the frame. In the disclosed embodiment, the frame 23 is made from a steel material, for example the type of material which is readily commercially available from a number of different vendors as ASTM-F15. The frame 23 is a plate-like element with parallel top and bottom surfaces, the outer edge of the frame 23 having an approximately rectangular shape. An opening 27 extends vertically through the center of the frame 23. The opening 27 has a shape which is approximately rectangular, except that it has rounded corners. The frame 23 has in its upper side an annular groove or recess 29 of approximately rectangular cross section. This recess 29 extends along the entire peripheral edge of the frame, so as to define along the entire periphery of the frame an outwardly projecting annular flange 32 which has a generally uniform width and thickness.

The window 24 is a plate-like element having parallel top and bottom surfaces, and has approximately the same thickness as the frame 23. The outer edge of the window has the shape of a rectangle with rounded corners, and in fact the window 24 has approximately the same size and shape as the opening 27 through the frame 23. The peripheral edge of the window 24 is fused directly to the material of the frame 23 along the entire length thereof, thereby defining an annular seal between the window 24 and frame 23 which extends completely around the window 24. This is a hermetic seal, which helps to keep the corrosive gas within the region 18 in the chamber 12 of the housing 11. The technique used to fuse the edges of the window 24 to the frame 23 is discussed in more detail later.

The window 24 includes a layer 38 of a borosilicon glass material, which in the disclosed embodiment is commercially available as catalog number 7056 from Corning Incorporated of Danville, Va. This particular glass material is transmissive to radiation in a range which is centered at a wavelength at about 545 nm, and which extends from approximately 420 nm to about 700 nm. Further, this particular glass material has an index of refraction which is approximately 1.47 to 1.50 for radiation at the center wavelength of 545 nm. However, it would alternatively be possible to use a different glass material which is transmissive to radiation in a different range of wavelengths, and/or which has a different index of refraction for radiation within the range of interest.

The window 24 has, on the underside of the glass layer 38, a very thin layer 41 of an opaque material, which in the disclosed embodiment is chrome. For clarity the thickness of the chrome layer 41 is exaggerated in the drawings in relation to the sizes of other parts. A rectangular aperture 42 is provided through the center of the chrome layer 41. The chrome layer 41 may optionally be omitted from the window 24.

Figure 3:
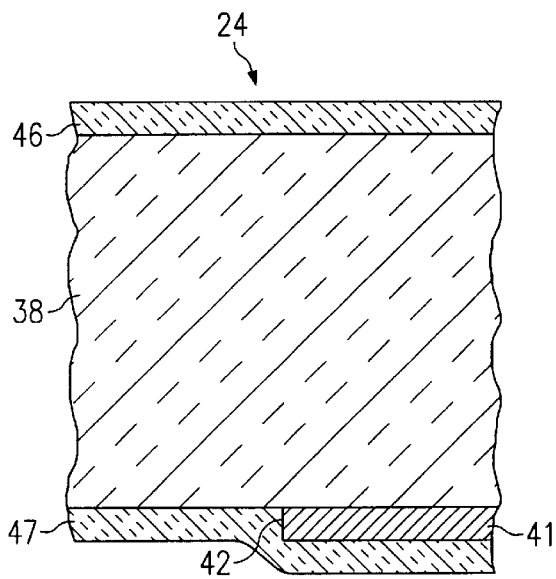
FIG. 3 is a diagrammatic sectional side view of a portion of the lid of FIG. 1.

The window 24 further includes, on both the top and bottom sides thereof, a very thin coating of an antireflective (AR) material. For clarity, the AR coatings are not separately shown in FIGS. 1 and 2. However, FIG. 3 is a diagrammatic fragmentary sectional side view of a small portion of the window 24, and shows the glass layer 38, the chrome layer 41 with the aperture 42, and also the AR coatings at 46 and 47. For clarity, the thicknesses of the chrome layer 41 and the AR coatings 46–47 are all exaggerated in FIG. 3. The AR coatings 46 and 47 are each transmissive to radiation within the above-mentioned range of approximately 420 nm to about 700 nm. In the disclosed embodiment, the AR coatings 46–47 are both made from silicon dioxide. However, they could alternatively be made from some other suitable antireflective material, such as magnesium fluoride.

With reference to FIG. 1, the apparatus 10 operates as follows. A beam of inbound radiation, which is represented diagrammatically by two arrows 56 in FIG. 1, passes through the window 24 and travels to the DMD 16. Each of the mirrors of the DMD 16 reflects a respective portion of the beam in a respective direction determined by the current physical location of that mirror. The various independently reflected portions of the original beam are each referred to here as a sub-beam. The different sub-beams then travel away from the DMD 16 in various different directions, and at least some of them will travel back out through the window 24, as indicated diagrammatically in FIG. 1 by two arrows 57.

For simplicity, the arrows representing the inbound radiation 56 and the outbound radiation 57 are shown as vertical lines in FIG. 1, but it will be recognized that various different beams and sub-beams would typically be traveling in various different directions. All of the radiation 56–57 passing in either direction through the window 24 must, of course, pass through the aperture 42 in the chrome layer 41.

Figure 4:
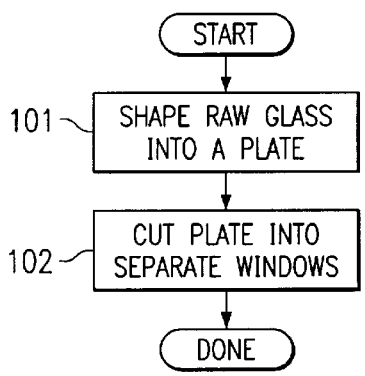
FIG. 4 is a flowchart showing a sequence of steps that are carried out to make glass windows in a method which embodies aspects of the present invention.

A method for simultaneously making several of the lids 17 will now be described. FIG. 4 is a flowchart showing a portion of this method. In particular, FIG. 4 shows a sequence of steps which are carried out to make a plurality of glass elements that will each become a glass layer 38 within the window 24 of a respective lid 17. In more detail, block 101 in FIG. 4 indicates that raw glass material is shaped into a plate. As noted above, the raw glass material used in the disclosed embodiment is a borosilicate glass material which is commercially available as catalog number 7056 from Corning Incorporated. A quantity of this raw glass material is heated for approximately 16 hours at a temperature which is increased progressively from an ambient room temperature of about 25° C. to a temperature of 1050° C. This heated glass material is then pressed and/or formed into a sheet having a uniform thickness of about 0.155 inches. This glass sheet is then gradually cooled back to 25° C.

Figure 5:
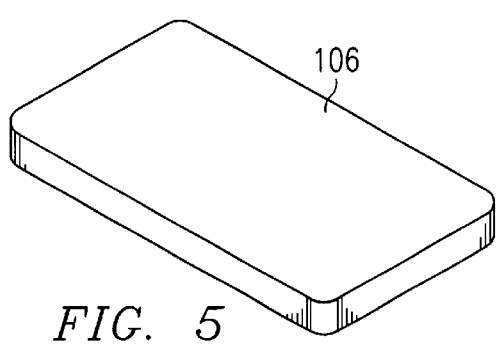
FIG. 5 is a diagrammatic perspective view of a glass window produced by the method of FIG. 4.

Next, at block 102, the glass sheet is cut into a plurality of separate glass window elements. FIG. 5 is a diagrammatic perspective view showing one of these glass window elements at 106. The glass window elements 106 are each cut from the glass sheet by machining or milling, or by using a laser. The peripheral edge of the glass window 106 has an approximately rectangular shape, with rounded corners, so that the element 106 has effectively the same size and shape as the opening 27 (FIG. 2) in one of the frames 23. The glass window 106 is at this point somewhat thicker than the glass layer shown at 38 in FIGS. 2 and 3, because a portion of the glass window 106 will be subsequently removed by grinding and polishing, as discussed later.

Figure 6:
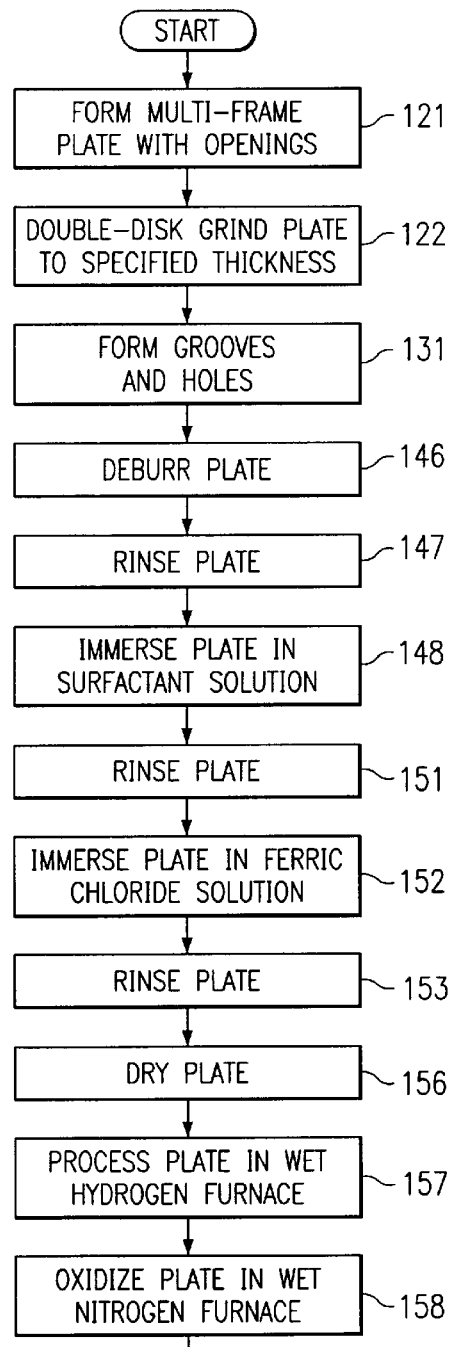
FIG. 6 is a flowchart showing a sequence of steps that are carried out to make a metal plate in a method which embodies aspects of the present invention.
Figure 7:
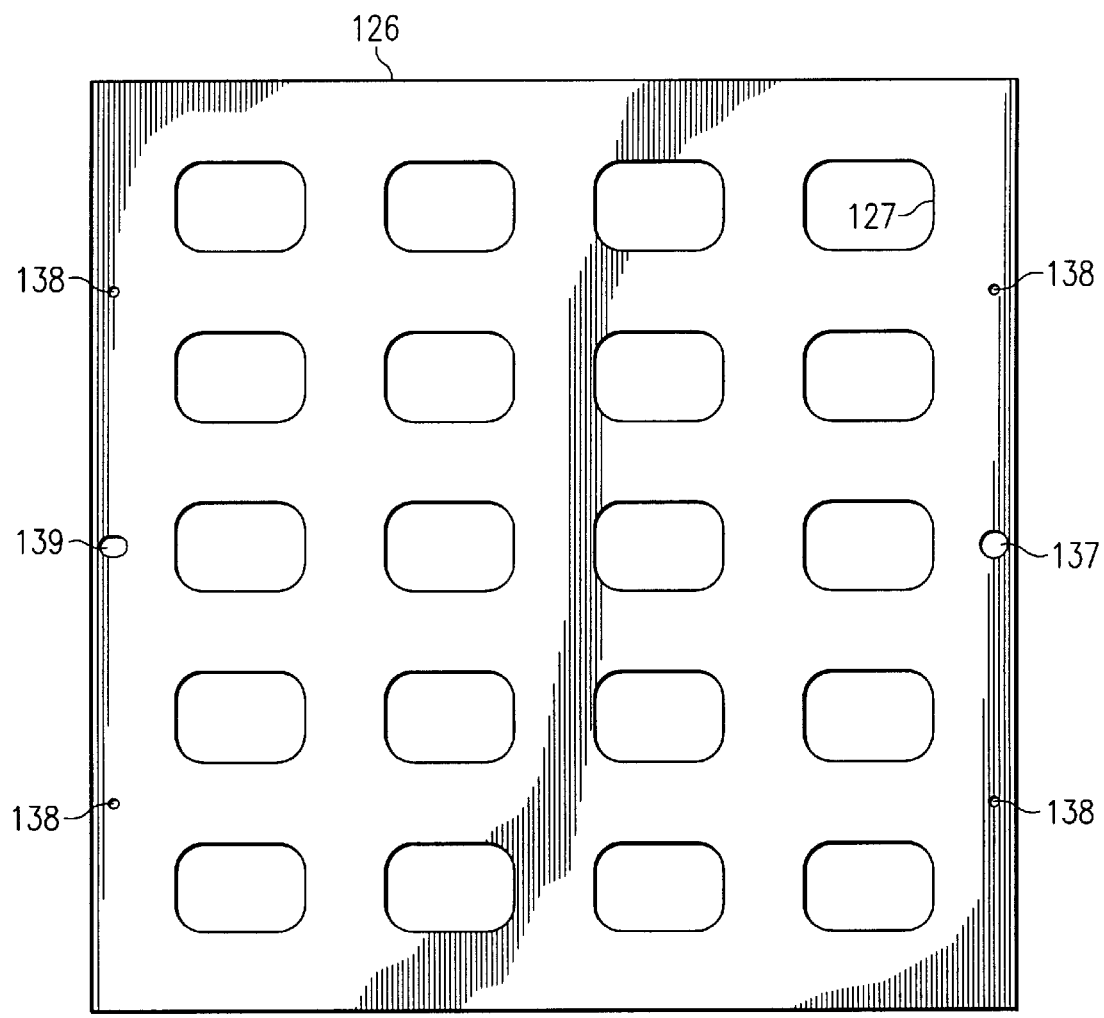
FIG. 7 is a diagrammatic bottom view of a metal plate produced by the method of FIG. 6.

FIG. 6 is a flowchart showing a sequence of steps which are carried out to make a metal plate having several sections that each correspond to the frame 23 of FIG. 2. The sequence shown in FIG. 6 begins with a sheet of raw metal which, in the disclosed embodiment, is a steel material commercially available as ASTM-F15. As indicted at block 121 in FIG. 6, this sheet of metal is subjected to fine-blanking, in order to create from it one or more square metal plates which, in the disclosed embodiment, each have a size of 7 inches by 7 inches. The fine-blanking process simultaneously creates a two-dimensional array of openings through each plate, where each opening is approximately rectangular but has rounded corners. In this regard, FIG. 7 is a diagrammatic bottom view of a square metal plate 126 which is one of the 7 inch by 7 inch plates separated from the metal sheet by fine-blanking. The plate 126 has twenty of the approximately rectangular openings 127 extending through it. These openings 127 are arranged in an array having five rows and four columns.

Figure 8:
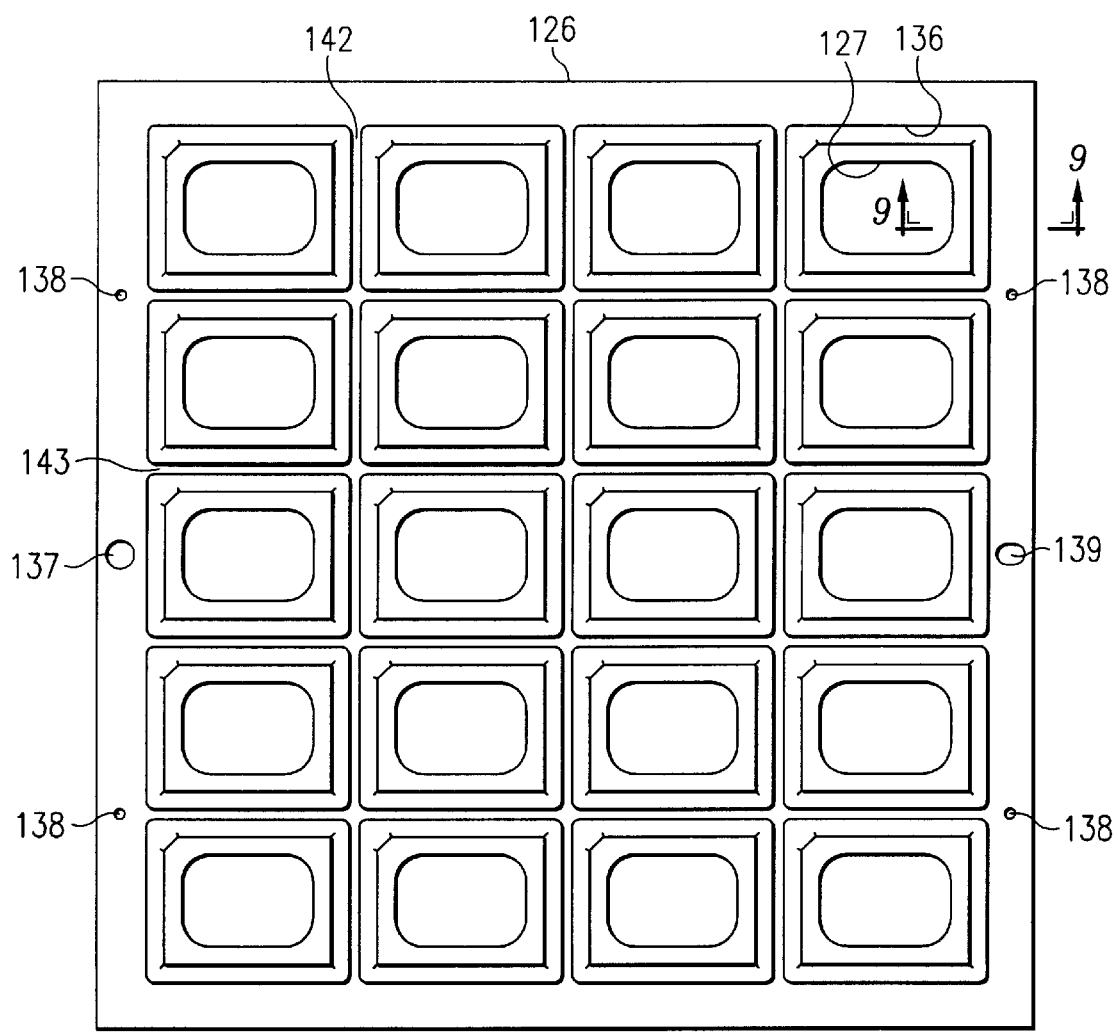
FIG. 8 is a diagrammatic top view of the metal plate of FIG. 7.
Figure 9:
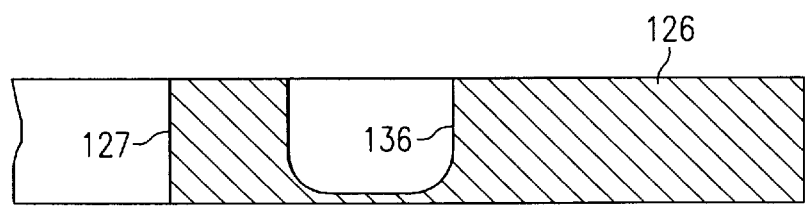
FIG. 9 is a diagrammatic fragmentary sectional side view taken along the line 9—9 in FIG. 8.

Next, as indicated at block 122 in FIG. 6, the plate 126 is subjected to double-disk grinding of a known type, in order to give it a selected uniform thickness, which in the disclosed embodiment is 0.115 inches. Then, with reference to block 131 in FIG. 6, twenty annular grooves are machined into an upper side of the plate 126. In this regard, FIG. 8 is a diagrammatic top view of the plate 126, showing the annular grooves 136. FIG. 9 is a diagrammatic fragmentary sectional side view of a portion of the plate 126, taken along the section line 9—9 in FIG. 8. It will be noted that each of the annular grooves 136 extends around one of the respective openings 127, in a manner so that the groove 136 is spaced outwardly a small distance from the opening 127 along the entire periphery of the opening 127.

Adjacent grooves 136 are spaced a small distance from each other, thereby defining a grid of perpendicular ribs 142 and 143 which each have the same vertical thickness as the plate 126, and which serve to rigidify the central region of the plate 126 during subsequent processing. The plate 126 will eventually be cut up to form 20 frames which are each equivalent to the frame 23 (FIGS. 1–2), in a manner discussed in more detail later.

Next, and still referring to block 131 in FIG. 6, several alignment holes of various sizes and shapes are machined or drilled through the plate 126. Examples of these alignment holes are indicated by reference numerals 137–139 in FIGS. 7–8. At block 146 in FIG. 6, the plate 126 is deburred using known techniques. Then, at block 147, the plate 126 and several other similar plates are loaded into a suitable support rack, and are rinsed in de-ionized (DI) water.

Then, with reference to block 148, the support rack with the plates thereon is immersed into a surfactant solution (soap solution) having a temperature of approximately 50° C. to 75° C., for a time interval in the range of approximately 5 minutes to 15 minutes. The rack and plates are then removed from this solution. Next, at block 151, the rack and the plates are rinsed with de-ionized water at room temperature.

Then, at block 152, the plates are etched by immersing the rack and plates into a room temperature ferric chloride solution for a time interval in the range of approximately 1 minute to 4 minutes. The rack and plates are then removed from this solution, and are allowed to drain. Then, at block 153, the rack and plates are rinsed for 15 minutes with room temperature de-ionized water. Then, at block 156, the rack and plates are dried at 150° C. for 20 minutes.

Next, the plates 126 are transferred from the rack to a ceramic support member, and are processed in a wet hydrogen furnace with a dew point setting of 15 to 30 PPM/° C. for a time interval in the range of approximately 11 to 15 minutes, while maintaining a peak temperature of approximately 950° C. to 1100° C. This serves to clean the metal plates by removing carbon, oxygen and sulfur impurities from the plates, along with other trapped contaminates, through the formation of products such as $CH_4$, $CO_2$ and $CO+H_2$.

As an alternative to the wet hydrogen process discussed above in association with block 157, the plates and the ceramic support member could be subjected to a 3:1 disassociated ammonia atmosphere with a dew point setting of 20 to 40 PPM/° C. for a dwell time of 10 to 30 minutes, while maintaining a temperature of approximately 1000° C. to 1250° C.

After completion of the wet hydrogen process discussed in association with block 157, the method proceeds to block 158, where the plates are transferred to a different ceramic support member. The plates are then oxidized by placing the plates and the ceramic support member in a wet nitrogen furnace for a time interval of approximately 9 to 13 minutes, while maintaining a peak temperature of approximately 600° C. to 1000° C. The layer of oxidation formed on the frames by this wet nitrogen process will have a thickness in the range of approximately 3 Å to 10 Å, and helps to increase the strength of the bond which will be formed between the glass and the metal. Too little oxidation or too much oxidation can serve to weaken the bond.

Figure 10:
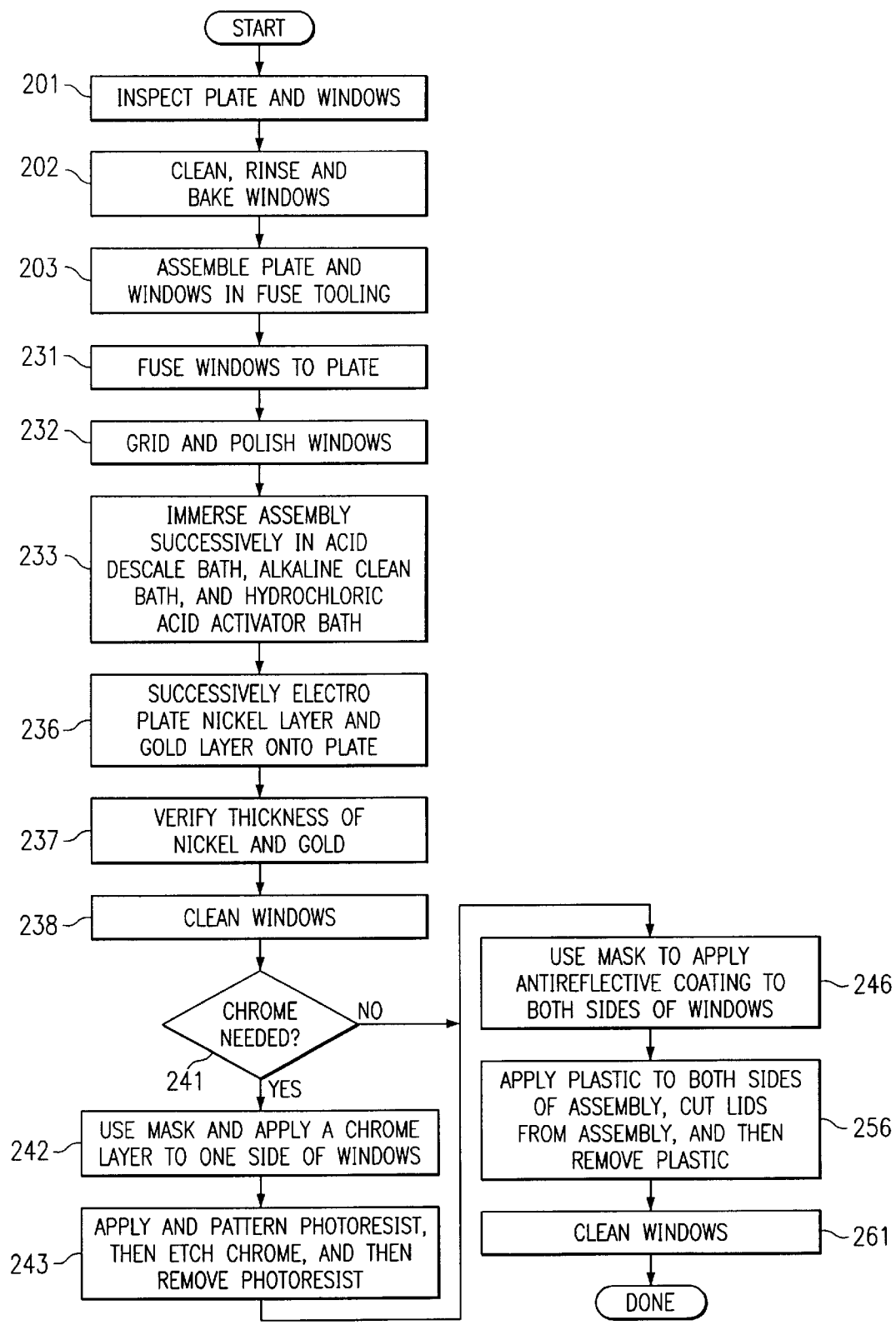
FIG. 10 is a flowchart showing a sequence of steps that are carried out to assemble various parts in a method which embodies aspects of the present invention.

FIG. 10 is a flowchart which shows a sequence of steps that are carried out in the disclosed embodiment in order to assemble the plate 126 (FIGS. 7–9) with 20 glass windows of the type shown at 106 (FIG. 5). In block 201, a sample subset of the metal plates 126 is selected for inspection, and a sample subset of the glass windows 106 is selected for inspection. In the disclosed embodiment, the inspection of frames and windows is carried out so as to obtain a 1% acceptable quality level (AQL), which is an industry standard technique where a table is used to determine the number of parts that need to be inspected in order to assure a specified quality level. The following explanation of the assembly procedure deals with plates and windows which have passed the inspection procedure.

In block 202 of FIG. 10, each of the glass windows 106 is cleaned by etching it in a 49% hydrofluoric acid solution for 30 seconds to 2 minutes at 20° C. to 40° C. Then, each glass window 106 is rinsed in de-ionized water. Thereafter, each glass window 106 is baked until it is thoroughly dry, for example at a temperature of 150° C. for 20 minutes.

Figure 11:
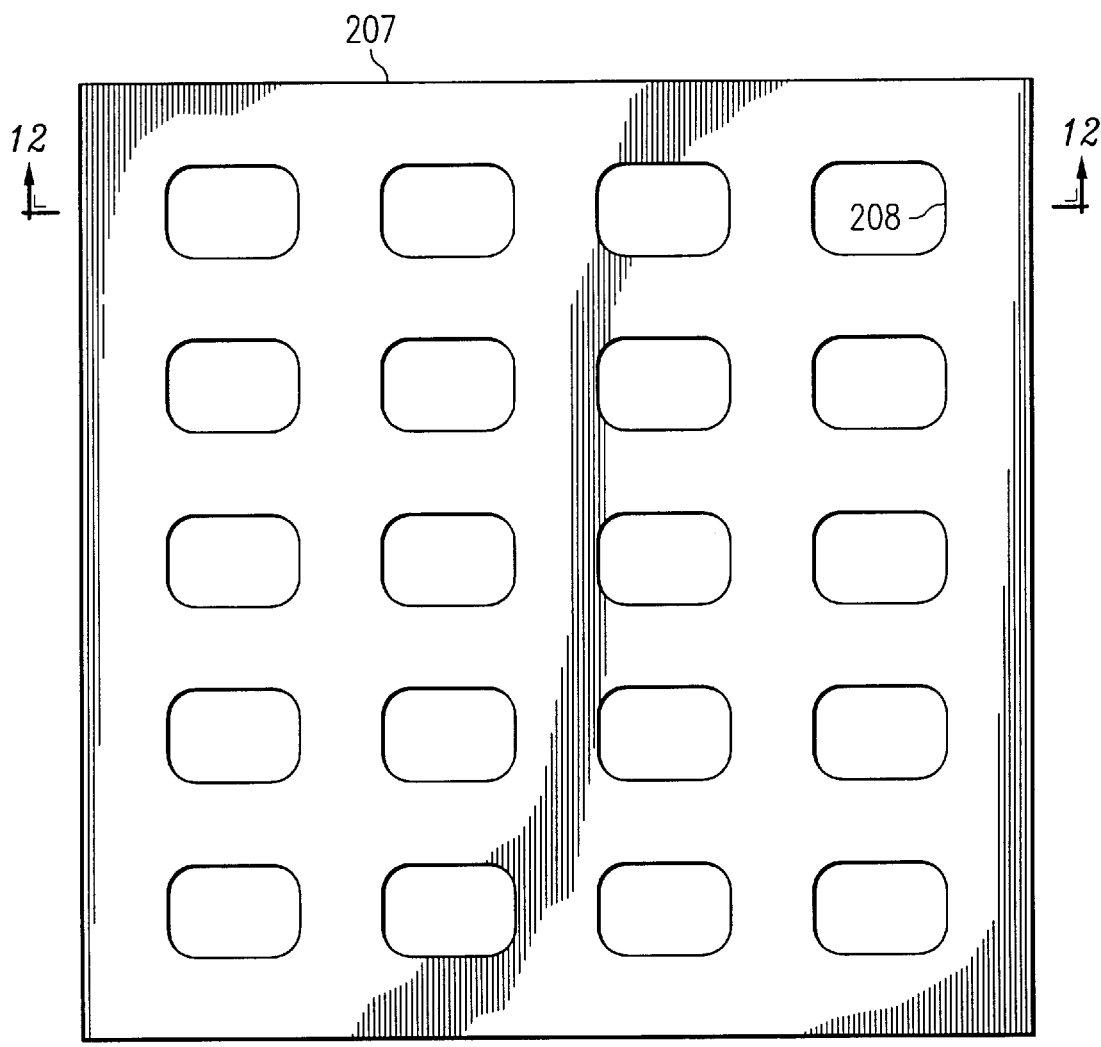
FIG. 11 is a diagrammatic top view of a lower fuse plate which is part of some tooling used during the method of FIG. 10.
Figure 12:
FIG. 12 is a diagrammatic sectional side view taken along the line 12—12 in FIG. 11.

Next, with reference to block 203 in FIG. 10, the plate 126 and twenty of the windows 106 are assembled through the use of fuse tooling, which holds them in 30 proper position with respect to each other until they can be fused together. In this regard, FIG. 11 is a diagrammatic top view of a lower fuse plate 207, which is part of the reusable fuse tooling provided for assembly. FIG. 12 is a diagrammatic sectional view of the lower fuse plate 207, taken along the section line 12—12 in FIG. 11. The plate 207 is made of a graphite material, has a size of 7 inches by 7 inches, and has in an upper side thereof a plurality of shallow recesses 208. The recesses 208 are each approximately rectangular with rounded corners, so as to have approximately the same size and shape as the window elements 106.

Figure 13:
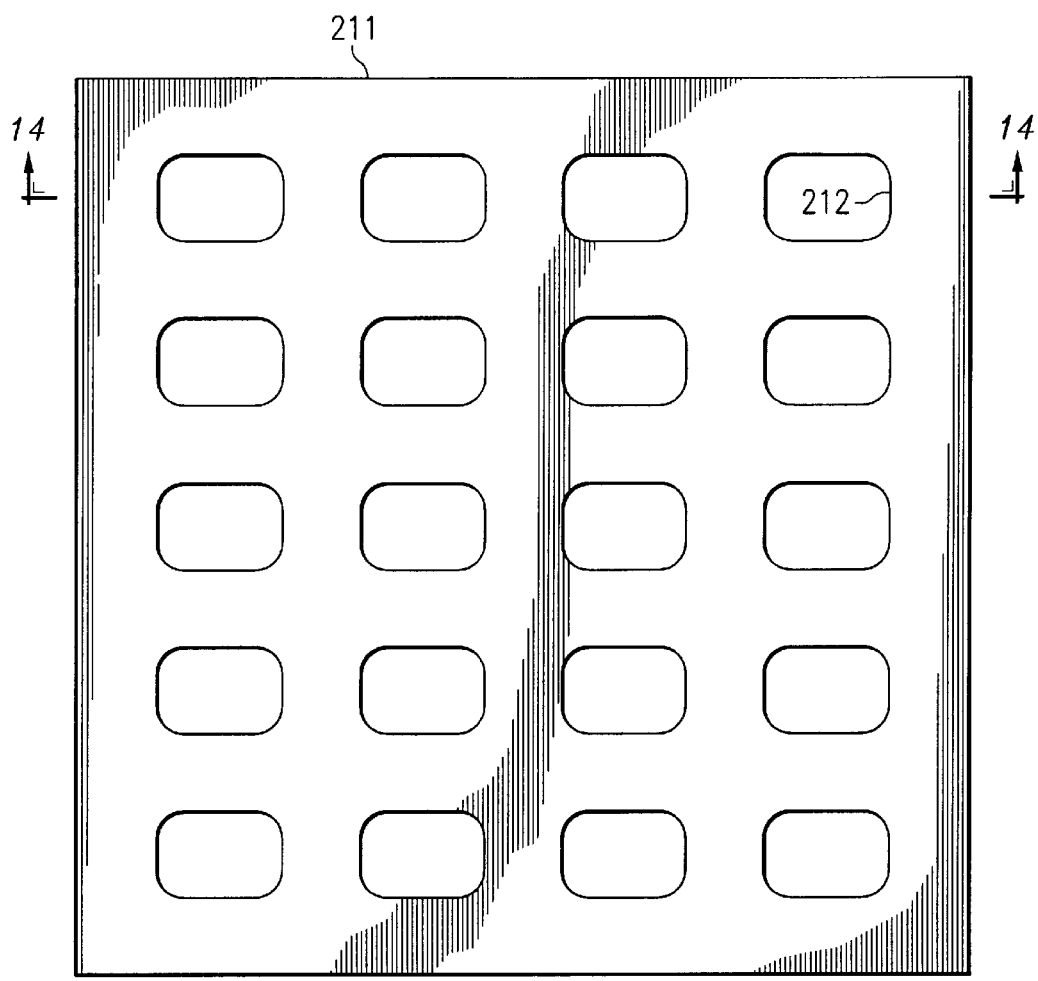
FIG. 13 is a diagrammatic top view of an upper fuse plate which is part of the tooling used during the method of FIG. 10.
Figure 14:
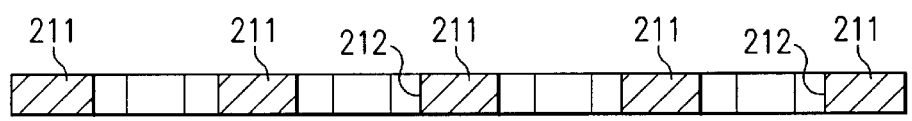
FIG. 14 is a diagrammatic sectional side view taken along the line 14—14 in FIG. 13.

FIG. 13 is a diagrammatic top view of an upper fuse plate 211, which is a further part of the reusable fuse tooling. FIG. 14 is a diagrammatic sectional side view of the fuse plate 211, taken along the line 14—14 in FIG. 13. The fuse plate 211 is made of a graphite material, has a size of 7 inches by 7 inches, and has a plurality of openings 212 extending through it. Each of the openings 212 has an approximately rectangular shape with rounded corners, and the size and shape of the openings 212 correspond to the size and shape of the window elements 106.

Figure 15:
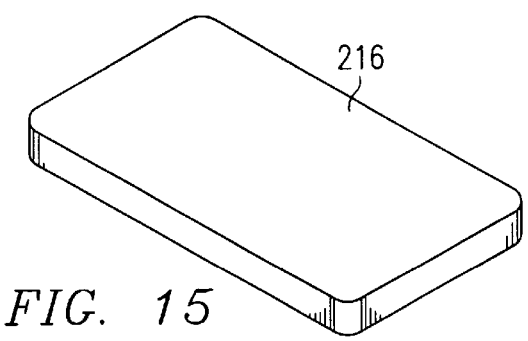
FIG. 15 is a diagrammatic perspective view of a counterweight which is part of the tooling used in the method of FIG. 10.

FIG. 15 is a diagrammatic perspective view of a counterweight 216, which is a further component of the reusable fuse tooling. The counterweight 216 is a plate-like element having parallel top and bottom surfaces, and having a peripheral edge which is shaped to be approximately rectangular with rounded corners. The counterweight is made of a graphite material, and the length and width of the counterweight 216 are slightly less than the length and width of each of the glass windows 106.

Figure 16:
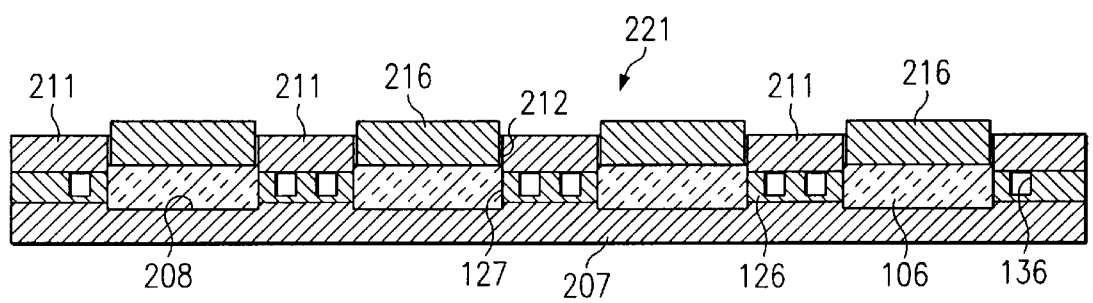
FIG. 16 is a diagrammatic sectional side view of an assembly which exists at an interim stage of the method of FIG. 10.

FIG. 16 is a diagrammatic sectional side view of an assembly 221 which includes the lower fuse plate 207, the upper fuse plate 211, the metal plate 126, twenty of the glass windows 106, and twenty of the counterweights 216. In more detail, twenty of the glass windows 106 are each placed on the lower fuse plate 207 so that a lower portion thereof is disposed in a respective one of the shallow recesses 208. The metal plate 126 is then added, by moving it in a downward direction until it is rests on top of the lower fuse plate 207. The twenty glass windows 106 will each be received within a respective opening 127 in the metal plate 126. The glass windows 106 each have an initial thickness which is somewhat larger than the thickness of the metal plate 126. The shallow recesses 208 each have a depth which is approximately half of the difference between the thickness of the glass windows 106 and the thickness of the metal plate 126. Consequently, as evident from FIG. 16, the recesses 208 position the window elements 106 so that each window element 106 projects outwardly by approximately the same amount on each side of the plate 126.

Next, the upper fuse plate 211 is added to the assembly, by moving it downwardly until it is resting on top of the metal plate 126. The upper portion of each of the glass windows 106 is received within the lower portion of a respective opening 212 through the upper fuse plate 211. Then, a respective one of the counterweights 216 is placed on top of each of the glass windows 106. The counterweights 216 serve to hold the glass windows 106 in place while the glass is being fused to the metal plate 126, which occurs in a manner discussed below. The counterweights 216 are sized so that they have sufficient weight to hold the glass windows 106 in place, but without exerting so much force that the material of the glass windows 106 will tend to flow and deform when heated during the fusing process.

Next, referring to block 231 in FIG. 10, the assembly 221 is placed in a furnace and fired in an inert atmosphere at a temperature of 900° C. to 1050° C. The assembly 221 is in the furnace for a time period from 1 hour and 45 minutes to 2 hours and 15 minutes, and is at the peak temperature for approximately 20 minutes. At this temperature, the material of the glass windows 106 softens, and the peripheral edge of each glass window 106 becomes directly fused to the edge of the associated opening 127 through the metal plate 126, all along the circumference thereof. At the end of the specified time interval, the assembly 221 is allowed to cool back to room temperature, so that the glass windows 106 harden again and become fixedly bonded to the metal plate 126. This creates a hermetic seal between the glass windows 106 and the metal plate 126 along the entire peripheral edge of each of the glass windows 106.

Due to the fact that the metal plate 126 has been cleaned through use of the wet hydrogen procedure discussed above (block 157 in FIG. 6), carbon and other impurities in the metal are substantially reduced, which in turn reduces the extent to which these impurities may produce various gases during the fusing process, which in turn substantially reduces the extent to which such gases can create undesirable bubbles within the material of the glass windows 106.

When the fusing process is complete, the metal plate 126 and the glass windows 106 secured thereto are separated from the fusing tooling, including the counterweights 216 and the upper and lower fuse plates 207 and 211. Due to the fact that the fuse plates 207 and 211, and the counterweight 216, are made from a graphite material, the glass material 106 does not tend to fuse to them during the fusing process, and it is thus not difficult to separate the metal plate 126 and glass windows 106 from the fuse tooling.

Due to the fact that the glass material of the windows 106 reaches a melting temperature and softens during the fusing process, the surfaces on opposite of each glass window 106 typically have their optical properties affected by the fusing process. Therefore, with reference to block 232 in FIG. 10, the opposite side surfaces of each glass window 106 are subjected to grinding and polishing. The separate terms "grinding" and "polishing" are both used herein, because it is customary in the industry to use both terms. But it will be recognized that grinding and polishing both involve abrasive refinement of the surfaces of the windows 106, and basically differ only in regard to the coarseness of the abrasive media which is utilized.

In the disclosed embodiment, both sides of all 20 glass windows 106 are ground and polished simultaneously. This is carried out through use of a not-illustrated double-disk grinding arrangement of a known type. In this double-disk grinding arrangement, two abrasive and coaxial disks with diameters of about 24 inches are rotated relative to each other, and the metal plate 126 with the glass windows 106 secured therein is placed between two facing surfaces on the disks, so that the opposite sides of each glass window 106 each engage a respective surface on a respective disk. Both side surfaces of each of the glass windows 106 are then ground and polished simultaneously, until each side surface is approximately flush with either the top surface or the bottom surface of the metal plate 126.

This grinding and polishing is carried out so as to achieve specified optical criteria. In the disclosed embodiment, the optical criteria are that both the top and bottom surfaces of each glass window 106 are polished to a flatness of four fringes spherical power and two fringes irregularity. Simultaneous grinding and polishing of both sides of all of the glass windows 106 provides a significant cost reduction over pre-existing techniques, where grinding and polishing are carried out on a single glass window mounted in a single metal frame.

Referring to block 233 in FIG. 10, when the grinding and polishing has been completed so as to meet the specified optical criteria, the assembly which includes the metal plate 126 with the windows 106 is subjected to processing which cleans the exposed surfaces of the metal plate 126. In particular, the assembly which includes the metal plate 126 and the glass windows 106 is successively immersed in an acid descale bath, an alkaline clean bath, and a hydrochloric acid bath. These baths serve to clean the exposed surfaces of the metal plate 126 in preparation for plating, including removal of the oxidation which was formed on the metal in block 158 of FIG. 6. In this regard, the purpose of the oxidation was to provide a surface on the metal plate 126 which would ensure a secure bond between the metal plate 126 and the glass windows 106. As to other surface portions of the metal, which are not engaged by the glass, it is appropriate to remove the oxidation from these surfaces so that these surfaces can be plated.

Next, at block 236, the exposed surfaces of the metal plate 126 are electroplated with a layer of nickel having a thickness of at least 200 microinches. Then, a layer of gold is electroplated onto the layer of nickel, the gold layer having a thickness of at least 50 microinches. The gold and nickel layers help to protect the ASTM-F15 steel material of the metal plate 126 from damage due to environmental factors, such as the corrosive characteristics of the lubricant gas which is disposed within the chamber 12 (FIG. 1) in the housing 11.

Next, with reference to block 237 in FIG. 10, the thickness of the nickel and gold layers is verified by an x-ray fluorescence (XRF) measurement, using techniques which are known in the art. In the disclosed embodiment, this XRF measurement is carried out on a subset of the assemblies that each include a metal plate 126 with windows 106 secured thereto. Then, at block 238, each of the glass windows 106 is cleaned on both sides. In the disclosed embodiment, this is carried out manually, using a lint-free cloth and isopropyl alcohol.

As discussed above in association with FIGS. 1–3, the chrome layer 41 with the aperture 42 is optional. Consequently, at block 241, a decision is made as to whether the chrome layer 41 is to be provided in the assembly which is currently being fabricated. If not, then the two subsequent blocks at 242 and 243 are skipped. Otherwise, the process proceeds to block 242.

In block 242, a mask is used to apply a chrome layer to the lower side of each of the glass windows 106. The mask is similar to the plate shown at 211 in FIGS. 13–14, except that the mask is made of metal and is significantly thinner than the plate 211. The mask is placed over the bottom side of the metal plate 126, so that the metal plate 126 is covered and only the bottom surfaces of the glass windows 106 are exposed. A layer of chrome is then sputtered onto the bottom surface of each of the glass windows 106, with a thickness in the range of 700 Å to 4,000 Å. The mask is then removed. Next, at block 243, a layer of photoresist is applied over the bottom surfaces of the metal plate 126 and the glass windows 106. This photoresist is patterned using known techniques, and then the chrome layer is etched so as to create in the chrome layer on each of the glass windows 106 a rectangular aperture, which corresponds to the aperture shown at 42 in the chrome layer 41 of FIGS. 1–2. The photoresist is then removed.

Next, at block 246 in FIG. 10, a mask is used to apply an anti-reflective coating to both sides of each of the glass windows 106. The mask used in block 146 is a thin metal mask which is physically equivalent to the metal mask discussed above in association with block 242. Through use of the mask, the anti-reflective coating is applied to each side surface of each window 106, but not to the gold-plated surfaces of the metal plate 126.

Figure 17:
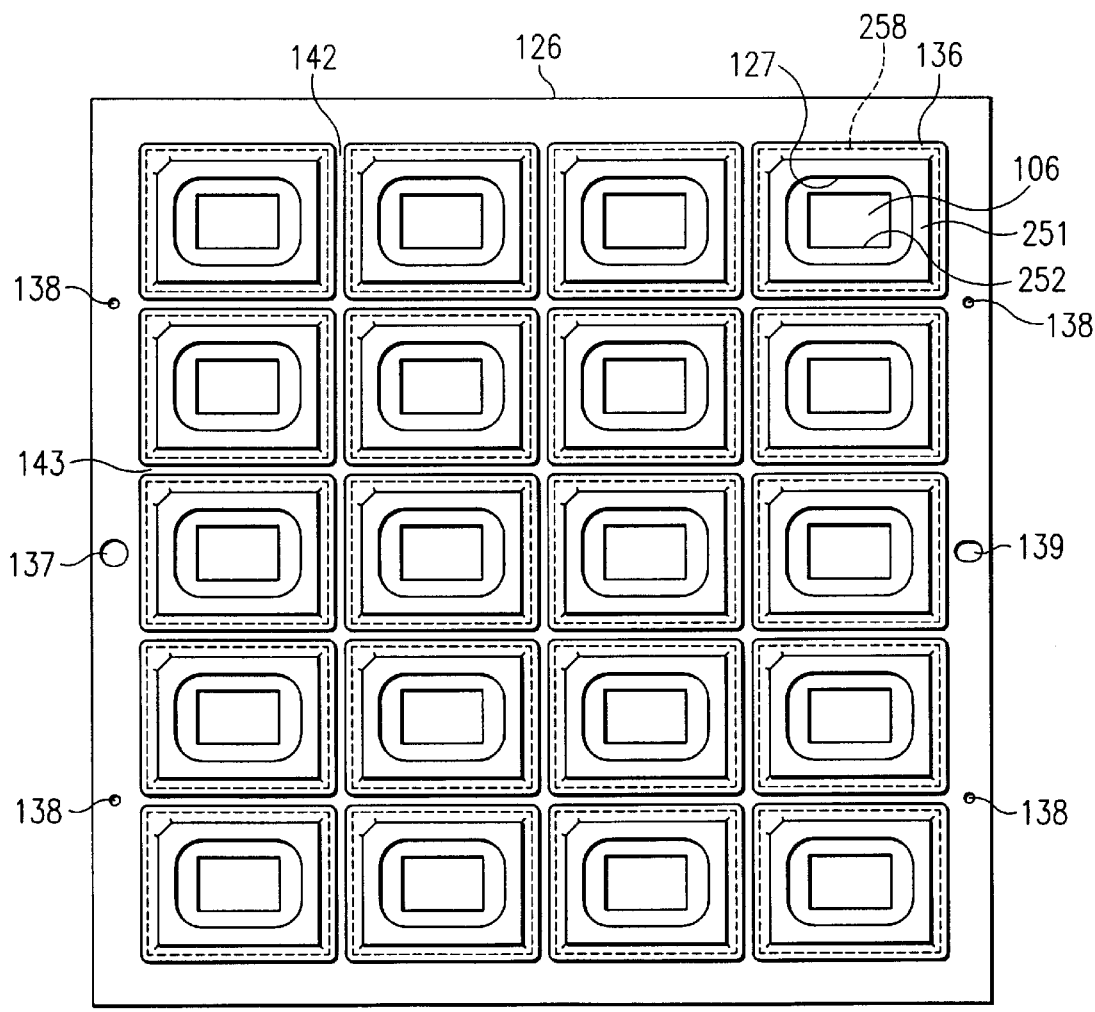
FIG. 17 is a diagrammatic top view of a further assembly which exists at an interim stage of the method of FIG. 10.

FIG. 17 is a diagrammatic top view of the assembly as it appears at this point in the fabrication process. The assembly of FIG. 17 includes the metal plate 126, and the windows 106 secured in the openings 127 of the plate 126. Reference numeral 251 denotes the chrome layer which is provided on and visible through one of the transparent windows 106, and reference numeral 252 designates the rectangular aperture through the chrome layer 251. The anti-reflective coatings are present, but are not separately depicted in FIG. 17.

Next, at block 256 in FIG. 10, a not-illustrated sheet of plastic material is temporarily applied to each side of the assembly shown in FIG. 17, for example in the form of a sheet of static cling plastic material. The purpose of this plastic material is to protect the glass windows 106 while pieces are cut from the plate 126. In particular, reference numeral 258 designates one of twenty rectangular broken lines, each of which represents a path along which a cut will be made through bottom wall of a respective groove 136 in the metal plate 126. The rectangular broken lines 258 in FIG. 17 each extend around a respective one of the glass windows and around an associated portion of the metal plate 126.

A precision cut is made along each of the broken lines 258, using a fine-blanking procedure of a known type. Alternatively, the cuts along the broken lines 258 could be made using a not-illustrated diamond wheel saw of a known type. After cuts have been made along each of the broken lines 258, twenty sections of the assembly will have been cut from the metal plate 126, and each of these sections will be a lid which is identical to the lid shown at 17 in FIGS. 1–2.

Next, with reference to block 261 in FIG. 10, the sheets of static cling plastic are removed from both sides of each of the twenty lids cut from the metal plate 126. Then, both sides of each window in each of these lids is cleaned with a lint-free cloth and isopropyl alcohol. In the rare event there is any residue which resists removal by the isopropyl alcohol, acetone may optionally be used with a lint-free cloth to remove the residue. After cleaning, each lid is ready to be installed in an apparatus of the type shown at 10 in FIG. 1.

The present invention provides a number of technical advantages. One such technical advantage is that, because a number of steps during the fabrication process are each carried out so that a plurality of optical windows in a single assembly are processed simultaneously, the overall cost of the resulting lids can be significantly reduced, by 25% or more.

One aspect of this is that the assembly can have a standard size such as 7 inches by 7 inches, regardless of the precise number of windows being processed. In this regard, the 7 inch×7 inch assembly can include a large number of windows when the windows are relatively small, or a smaller number of windows when the windows are relatively large. As a result, some specialized tooling may be needed for each configuration of the assembly, but certain other tooling can be standardized and used for all such assemblies having the standard size, regardless of the number of windows in any particular assembly. For example, when grinding and polishing the windows using double-disk grinding techniques, a single set of standardized tooling compatible with the 7 inch×7 inch assembly size can be developed, and then used for all such assemblies, regardless of the specific number of windows in each assembly. Due to factors such as the significant cost of specialized tooling, standardization of the tooling can help to significantly reduce the overall costs of the resulting lids.

A further advantage is that separate lids are not cut from each assembly until after almost all process steps have been completed, which also helps to effect a significant cost reduction. This is particularly true as to the steps of grinding and polishing the glass windows, applying and etching the optional chrome layers, and then applying anti-reflective coatings.

Still another advantage is realized where a metal frame is subjected to a wet hydrogen process in order to remove impurities from the surface of the frame before it is oxidized and then fused to a glass window. The wet hydrogen process is significantly more effective at removing impurities than pre-existing techniques. Due to the fact that the wet hydrogen process is particularly effective in removing impurities, it results in a significant reduction in the formation of gases and thus the formation of bubbles within the glass windows. This in turn effects a significant reduction in the number of parts that must be discarded as defective, which represents a significant increase in the effective yield of the fabrication process, and thus a reduction in the cost of each part.

Although one embodiment has been illustrated and described in detail, it will be understood that various substitutions and alterations are possible without departing from the spirit and scope of the present invention, as defined by the following claims.

What is claimed is:

1. A method, comprising the steps of:
   forming a plurality of windows which are each transmissive to radiation having a predetermined wavelength;
   fabricating a plate with a plurality of openings therethrough;
   fixedly securing each said window to said plate in a manner so that an annular seal is provided between an annular portion of the window extending along a periphery thereof and an annular portion of the plate extending around the opening;
   simultaneously processing a respective surface on each of said windows secured to said plate; and
   followed by the step of forming on one surface of each said window an opaque layer having an aperture therethrough;
   thereafter cutting from said plate a plurality of sections which each include a respective one of said windows and a respective one of said annular portions of said plate.

2. A method according to claim 1,
   wherein said step of forming said windows is carried out so that said windows are each thicker than said plate;
   wherein said step of fixedly securing said windows to said plate includes the step of positioning said windows so that they each project outwardly a small distance beyond said plate on each side thereof; and
   wherein said step of processing said windows includes the steps of simultaneously effecting abrasive refinement of a respective surface on one side of each of said windows, and simultaneously effecting abrasive refinement of a respective surface on the other side of each of said windows.

3. A method according to claim 2, wherein said steps of effecting abrasive refinement are carried out by simultaneously effecting abrasive refinement of surfaces on both sides of each of said windows.

4. A method according to claim 3, wherein said step of effecting abrasive refinement is carried out with a double-disk grinding technique.

5. A method according to claim 1, wherein said step of fixedly securing said windows to said plate is carried out by heating said plate and said windows in a manner causing a peripheral portion of each of said windows to become fused directly to the material of said plate.

6. A method according to claim 1, wherein said step of forming an opaque layer is carried out by sputtering chrome onto each said window, and then etching said aperture through said chrome on each said window.

7. A method according to claim 2, including after said step of effecting abrasive refinement and before said cutting step, the step of applying an antireflective layer to at least one side of each said window.

8. A method according to claim 1, wherein said fixedly securing step includes the steps of:
   supporting each of said windows in a shallow recess of a first part;
   supporting said plate on said first part with said windows disposed in said openings through said plate;
   supporting on said plate a second part having a plurality of openings which each receive an upper end of a respective one of said windows; and
   providing within each of said openings of said second part a respective counterweight which rests on a respective said window.

* * * * *

UNITED STATES PATENT AND TRADEMARK OFFICE
CERTIFICATE OF CORRECTION

PATENT NO. : 6,745,449 B2
APPLICATION NO. : 10/045639
DATED : June 8, 2004
INVENTOR(S) : Mark B. Hanna and Kyle W. Nix It is certified that error appears in the above-identified patent and that said Letters Patent is hereby corrected as shown below:

Column 5:
Line 44, after "ASTM-F15. As" delete "indicted" and insert -- indicated --.

Column 7:
Line 12, after "which holds them in" delete "30."
Line 63, after "downward direction until it" delete "is."

Signed and Sealed this

Seventeenth Day of April, 2007

JON W. DUDAS
*Director of the United States Patent and Trademark Office*